(No Model.)
P. O. KEILHOLTZ.
SYSTEM OF ELECTRIC DISTRIBUTION.
No. 561,002. Patented May 26, 1896.
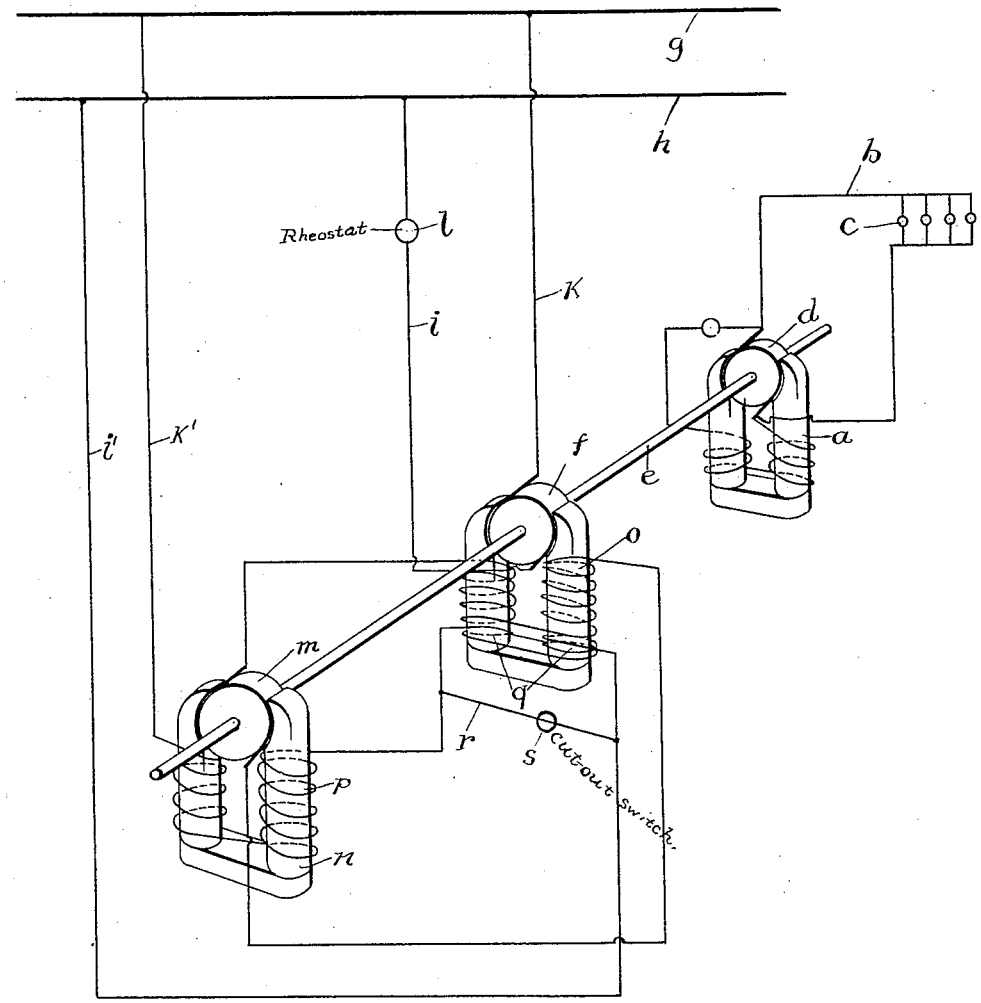
Witnesses
Inventor
Pierre O. Keilholtz,
by John E. Morris.
Attorney

UNITED STATES PATENT OFFICE.

PIERRE O. KEILHOLTZ, OF BALTIMORE, MARYLAND, ASSIGNOR OF ONE-HALF TO JAMES F. HEYWARD, OF SAME PLACE.

SYSTEM OF ELECTRIC DISTRIBUTION.

SPECIFICATION forming part of Letters Patent No. 561,002, dated May 26, 1896.

Application filed February 29, 1896. Serial No. 581,295. (No model.)

*To all whom it may concern:*

Be it known that I, PIERRE O. KEILHOLTZ, a citizen of the United States, residing at Baltimore, in the State of Maryland, have invented certain new and useful Improvements in Systems of Electric Distribution; and I do declare the following to be a full, clear, and exact description of the invention, such as will enable others skilled in the art to which it appertains to make and use the same, reference being had to the accompanying drawing, and to the letters of reference marked thereon, which forms a part of this specification.

My invention relates to those systems of electrical distribution commonly known as "constant-potential" systems, in which electricity is transmitted from a source of energy to a distant point of consumption through the medium of conductors.

It is well known that the potential of a system at a distant point will vary in accordance with the variation of load in said system, particularly when the intervals of variation are of short duration. It is true that these variations can be overcome to a large extent by the employment of conductors of low resistance; but, owing to the excessive cost of such conductors, in addition to other reasons, such a remedy has been found to be commercially impractical.

To overcome the defects above mentioned, I have provided such an arrangement of translating devices whereby a uniform effect can be obtained, notwithstanding the variations of potential. Furthermore, by the employment of my invention a uniform intensity of illumination may be maintained irrespective of the variations.

Referring now to the drawing, in installing a system according to my invention I employ any desired form of dynamo $a$, adapted to supply current to a circuit $b$, involving a series of lamps $c$ of a quality conforming with the dynamo.

In order to revolve the armature $d$ of the dynamo $a$, I mount upon its shaft $e$ and distant therefrom a second armature $f$, energized from a circuit of variable potential, comprising conductors $g$ and $h$, through the medium of conductors $i$ and $k$, the former including a starting-rheostat $l$. Mounted upon the shaft $e$ is a third armature $m$ of a regulating-dynamo $n$, whose armature and field involve distinct circuits. The circuit of the armature $m$ includes the major field-coils of the motor $o$, so that the field intensity of said motor may vary in accordance with the variation of current supplied by the said armature $m$.

The field-coils $p$ of dynamo $n$ are energized from conductors $g$ and $h$ through the medium of conductors $i'$ and $k'$, the circuit of said coils including also normally auxiliary field-coils $q$ of motor $o$. A short circuit $r$, provided with cut-out $s$, is arranged across the circuit just mentioned, in order that coils $q$ may be short-circuited, and thus practically be rendered inactive.

The operation of my system is as follows: The cut-out $s$ being open, the rheostat $l$ is brought into circuit, when the shaft $e$ begins to revolve slowly and the conditions are a weak field for motor, due to little current from armature $m$ and conductors $i'$ and $k'$ through the medium of coils $n$ and $q$, with little current through armature $f$. As the rheostat $l$ is further rotated the strength of armature $f$ increases, and simultaneously therewith the field of motor $o$, until the desired speed of revolution of shaft $e$ is obtained. The cut-out $s$ is then closed, and the field of motor $o$ is thus deprived of direct energy from conductors $g$ and $h$. If now a decrease of potential occurs, a decrease of field strength of dynamo $m$ is a result, and in consequence the current delivered to the field of $o$ from armature $m$ decreases, and the field strength of $o$ drops accordingly, which conditions will maintain a constant speed of rotation of the shaft $e$, and therefore maintaining a constant potential of the circuit, including lamps $c$.

When the potential of the feeder system rises, the operation is directly opposite to that just explained.

It will be readily understood that I may vary the particular construction and arrangement herein shown and described and that I may transmit motion from armature $f$ to armatures $d$ and $m$ through the medium of gearing or other desired mechanism without departing in any way from the spirit of my invention.

Having now described my invention and its method of operation, what I claim is—

1. A system comprising a motor and a dynamo, the field of the motor being in circuit with the armature of the dynamo, auxiliary windings on the motor-field in series with the field of the dynamo and means for revolving the armatures of the motor and dynamo in unison.

2. A system comprising a dynamo and a motor, the winding of one element of the former being in parallel with the opposite element of the latter, the second element of the dynamo being in series with a major winding of the opposite element of the motor, an auxiliary winding on said opposite element in series with a like element of the dynamo.

3. A system comprising a dynamo and a motor, the winding of one element of the former being in parallel with the opposite element of the latter, the second element of the dynamo being in series with a major winding of the opposite element of the motor, an auxiliary winding on one element of the motor in series with the winding of the similar element of the dynamo and means for "killing" the auxiliary circuit.

4. A system comprising a dynamo and a motor, the winding of one element of the former being in parallel with the opposite element of the latter, the second element of the dynamo being in series with a major winding of the opposite element of the motor, said opposite element having also an auxiliary winding in series with the winding of the similar element of the dynamo, means for killing the auxiliary circuit, and connections between the revoluble elements of the dynamo and motor whereby they may revolve in unison.

5. A system comprising a dynamo and a motor, connections between the armatures of the motor and dynamo for revolving the latter, electrical connections between the dynamo and field-coils of the motor for energizing the latter, auxiliary field-coils on the motor in series with the field-coils of the dynamo, both of said coils being in parallel with the armature of the motor.

6. The method of maintaining constant speed in a motor which consists in reducing its field strength and load in accordance with the current applied to the armature.

7. In a system for converting electric current of variable potential into constant effective energy, a motor and a dynamo, the latter adapted to vary the field intensity of the motor in accordance with the variation in current supplied to the latter and in accordance with the variation in its load, a second dynamo adapted to be driven by said motor and translating means in circuit with the said second dynamo.

8. A system comprising a motor and a dynamo, the fields of one being in parallel with the armature of the other, said motor having its field in series with the armature of the dynamo, an auxiliary field on the motor in series with the field of the dynamo and means for revolving the armatures of the motor and dynamo in unison.

In testimony whereof I affix my signature in presence of two witnesses.

PIERRE O. KEILHOLTZ.

Witnesses:
HARRY M. GRAFTON,
GEORGE W. HATCH.